US011461771B2

(12) United States Patent
Coburn et al.

(10) Patent No.: US 11,461,771 B2
(45) Date of Patent: Oct. 4, 2022

(54) HYBRID DIGITAL LEDGER CONTROL WITH ADDRESS ENCODING

(71) Applicant: FirstBlood Technologies, Inc., Everett, MA (US)

(72) Inventors: Zachary Robert Coburn, Chicago, IL (US); Luka Podlesnik, Celje (SI)

(73) Assignee: FirstBlood Technologies, Inc., Everett, MA (US)

( * ) Notice: Subject to any disclaimer, the term of this patent is extended or adjusted under 35 U.S.C. 154(b) by 35 days.

(21) Appl. No.: 16/683,351

(22) Filed: Nov. 14, 2019

(65) Prior Publication Data

US 2020/0104836 A1    Apr. 2, 2020

Related U.S. Application Data

(63) Continuation-in-part of application No. 16/138,146, filed on Sep. 21, 2018, and a continuation-in-part of
(Continued)

(51) Int. Cl.
*A63F 9/24*    (2006.01)
*G06Q 20/36*    (2012.01)
(Continued)

(52) U.S. Cl.
CPC ......... *G06Q 20/3678* (2013.01); *G06F 16/27* (2019.01); *G06Q 20/065* (2013.01);
(Continued)

(58) Field of Classification Search
CPC ... H04L 9/3239; H04L 9/0637; H04L 9/0643; H04L 9/3213
See application file for complete search history.

(56) References Cited

U.S. PATENT DOCUMENTS 6,443,841 B1    9/2002    Rossides
7,367,888 B1    5/2008    Chen et al.
(Continued)

FOREIGN PATENT DOCUMENTS

WO    WO2016073589 A1    5/2016

OTHER PUBLICATIONS

International Search Report dated Apr. 27, 2018 for PCT/US2018/012286.

*Primary Examiner* — David L Lewis
*Assistant Examiner* — Eric M Thomas
(74) *Attorney, Agent, or Firm* — Adams Intellex, PLC

(57) ABSTRACT

Disclosed techniques enable hybrid digital ledger control with address encoding. A digital ledger is accessed using a centralized computing platform. The digital ledger comprises a decentralized blockchain. A wallet address for a user is determined, where the wallet address is associated with a digital token in the digital ledger. A digitally mapped value is encoded based on the wallet address. The digitally mapped value includes the wallet address, a transaction amount, and a type of digital currency. Access to the digital token is enabled, where the access is enabled using the encoding, the centralized computing platform, and the digital ledger. A smart contract is updated using the centralized computing platform, where the updating reflects the access enabled to the digital token.

26 Claims, 11 Drawing Sheets

Related U.S. Application Data application No. 15/861,948, filed on Jan. 4, 2018, now Pat. No. 10,572,872.

(60) Provisional application No. 62/767,777, filed on Nov. 15, 2018, provisional application No. 62/561,981, filed on Sep. 22, 2017, provisional application No. 62/443,086, filed on Jan. 6, 2017.

(51) Int. Cl.
 *G06F 16/27* (2019.01)
 *G06Q 20/06* (2012.01)
 *G06Q 20/38* (2012.01)

(52) U.S. Cl.
 CPC ....... *G06Q 20/389* (2013.01); *G06Q 20/3827* (2013.01); *G06Q 2220/00* (2013.01)

(56) References Cited

U.S. PATENT DOCUMENTS

| | | |
|---|---|---|
| 9,298,806 B1 | 3/2016 | Vessenes et al. |
| 9,635,000 B1 | 4/2017 | Muftic |
| 9,659,439 B1 | 5/2017 | Aleksey |
| 9,667,427 B2 | 5/2017 | Dberhauser et al. |
| 2007/0265092 A1 | 11/2007 | Betteridge |
| 2009/0170604 A1 | 7/2009 | Mueller et al. |
| 2011/0196723 A1 | 8/2011 | Baszucki et al. |
| 2015/0209678 A1 | 7/2015 | Edwards et al. |
| 2016/0292680 A1 | 10/2016 | Wilson, Jr. et al. |
| 2017/0001115 A1 | 1/2017 | Melinger et al. |
| 2017/0103391 A1 | 4/2017 | Wilson, Jr. et al. |
| 2017/0109955 A1 | 4/2017 | Ernest et al. |
| 2017/0111175 A1 | 4/2017 | Oberhauser et al. |
| 2017/0116693 A1 | 4/2017 | Rae et al. |
| 2017/0124535 A1 | 5/2017 | Juels et al. |
| 2017/0126702 A1 | 5/2017 | Krishnamurthy |
| 2017/0140145 A1 | 5/2017 | Shah |
| 2017/0154331 A1 | 6/2017 | Voorhees |
| 2017/0228731 A1 | 8/2017 | Sheng et al. |
| 2018/0043265 A1 | 2/2018 | Edwards et al. |
| 2018/0089758 A1* | 3/2018 | Stradling ............ G06F 12/1408 |
| 2018/0241546 A1 | 8/2018 | Leng et al. |
| 2019/0349426 A1* | 11/2019 | Smith .................... H04W 4/70 |

\* cited by examiner

HYBRID DIGITAL LEDGER CONTROL WITH ADDRESS ENCODING

RELATED APPLICATIONS

This application claims the benefit of U.S. provisional patent application "Hybrid Digital Ledger Control with Address Encoding" Ser. No. 62/767,777, filed Nov. 15, 2018.

This application is also a continuation-in-part of U.S. patent application "Competitive Arbitration using Digital Ledgering" Ser. No. 15/861,948, filed Jan. 4, 2018, which claims the benefit of U.S. provisional patent application "Competitive Arbitration using Digital Ledgering" Ser. No. 62/443,086, filed Jan. 6, 2017.

This application is also a continuation-in-part of U.S. patent application "Digital Ledger Authentication Using Address Encoding" Ser. No. 16/138,146, filed Sep. 21, 2018, which claims the benefit of U.S. provisional patent application "Digital Ledger Authentication Using Address Encoding" Ser. No. 62/561,981, filed Sep. 22, 2017.

Each of the foregoing applications is hereby incorporated by reference in its entirety.

FIELD OF ART

This application relates generally to authentication and more particularly to hybrid digital ledger control with address encoding.

BACKGROUND

Digital currency is a non-physical currency that is being used to buy or sell goods and services, to conduct business, to transfer funds, and for many other applications for which traditional currencies were previously used. As with physical currency, digital currency has units. Unlike specie or fiat currency, which is tangible and can be carried around, digital currency is sent and received electronically. The units of digital currency are stored in a digital account or "wallet". Digital currencies include virtual currencies and cryptocurrencies. Virtual currencies are often exchanged between and among members of a virtual community. Virtual currencies are typically controlled by the developers of the virtual currencies. Some of the virtual currencies can be converted to real or hard currencies, such as virtual currencies issued by nations. In contrast, cryptocurrencies are a digital asset which can be used as a medium of exchange. The cryptocurrencies are based on recording and verifying transactions using strong cryptography. The cryptography secures cryptocurrency transactions against tampering and other unauthorized changes. Using the cryptography, transactions based on the cryptocurrencies cannot be repeated, deleted, or altered. The cryptocurrencies are also based on units of digital currency. Since the value of a cryptocurrency is based on the available or "minted" number of units of the cryptocurrency, cryptography is further used to control creation of additional units of the cryptocurrency. Examples of cryptocurrencies or their blockchain systems include Bitcoin™, Dash™, Ethereum™, and Monero™, among many others.

Digital currencies, like hard currencies, are used for purchasing goods and services, sending and receiving funds, making purchases within certain online communities, among many other uses. Cryptocurrencies, including decentralized cryptocurrencies, are generated at a rate that is publicly known so that the value of the cryptocurrencies can be determined. The rate of generation and the value of a given cryptocurrency are defined at the time the cryptocurrency is created. Factors that influence the price and value of a cryptocurrency include the supply of and the demand for the cryptocurrency, public perceptions of the value, innovation, utility of the cryptocurrency, security, stability, and other factors. To date, cryptocurrencies operate independently from centralized banking and economic systems.

Digital currencies, including virtual currencies and cryptocurrencies, have found many applications, some of which are lawful and others of which are not. Further, cryptocurrencies have encountered some legal difficulties such as their legal status in some countries. Some countries permit the use of cryptocurrencies for purchasing and selling goods and services, and generally for trade, while other countries limit or altogether ban the use of cryptocurrencies. For purposes of taxation, cryptocurrencies are at times treated as currencies and at other times as property. There are also concerns that the cryptocurrencies could enable an economy, potentially even a global economy, which is unregulated. Concerns include the use of cryptocurrencies for payments to cyber criminals and other malefactors. Another point of concern is the use of cryptocurrencies in illegal or underground markets such as "Darknet" markets. The "Darknet" markets include online sales of illegal drugs, weapons, stolen goods, and counterfeit goods.

SUMMARY

Disclosed techniques enable hybrid digital ledger control with address encoding. A digital ledger is a distributed ledger that is based on consensus. A consensus regarding digital data that is replicated, synchronized, and shared is formed. Typically, the digital ledger is distributed over a wide geographic area. In order for a distributed ledger to operate successfully, the various nodes that choose to participate in the distributed ledger must have access to a peer-to-peer network. Further, algorithms, called consensus algorithms, are used to perform the replication of the digital data from the ledger across the participating nodes. The digital ledger can be used to record transactions such as making or receiving payments, providing or receiving goods or services, participating in a contest such as an eSports contest, and so on. The digital ledger ensures that transactions are recorded accurately. The digital ledger further ensures that transactions cannot be repeated, deleted, altered, or otherwise tampered with, without all parties involved in the transaction being notified. Further, the digital ledger can be observed by a variety of witnesses who can see the transactions and verify that the transactions are justified and accurate.

A digital ledger can be accessed for the purposes of conducting a transaction. The access to the digital ledger can be initiated by a user who wants to purchase a good or service, to send or receive funds, to engage with a digital competition platform such as an eSports platform, and so on. The digital ledger can include a digital wallet owned by the user. The digital wallet owned by the user is based on the type or types of cryptocurrencies that person uses. A wallet address can be determined for a user, where the wallet address is associated with a digital token in the digital ledger. The wallet address is unique to the user so that transactions initiated by the user are only charged to or credited to that user. The wallet can include one or more cryptocurrencies, where a cryptocurrency can be smart contract-enabled. A digitally mapped value can be encoded based on the wallet address. The digitally mapped value can be determined based on the wallet address. The digitally mapped value can be determined by hashing the wallet address. The digitally mapped value can be signed using a private key from a digital purveyor. Access to the digital token can be enabled, wherein the access is enabled using the encoding, the centralized computing platform, and the digital ledger. Authentication can succeed when the digitally mapped value is reverified using a re-encoding of the wallet address and the digital signature. The reverification can enable a predetermined smart contract transaction or other transaction to take place. If reverification is successful, an entry can be appended to the digital ledger, where the entry includes the digitally mapped value. The entry can indicate that a transaction has taken place based on an agreement by the user that certifies the smart contract.

The digital purveyor can provide digital tokens. The digital tokens can be purchased using a cryptocurrency from the user's wallet. Digital tokens may also be purchased using a credit card or wire transfer. The digital tokens can be used for a variety of purposes, such as accessing a digital competition platform. The digital competition platform can include an eSports platform on which players can participate in a variety of eSports. Active user agreement is required to enable the purchase of digital tokens. To purchase the digital tokens, the user certifies that she or he agrees to stipulations related to the smart contract. The user can certify the smart contract using a variety of techniques, such as selecting check boxes, clicking radio buttons, or typing required words into a web-enabled interface. Other certification techniques may be available. Transaction accuracy is further ensured by reverifying the digitally mapped value by re-encoding the wallet address. The re-encoding includes matching a private key signature, where the private key signature is based on the private key provided by the digital purveyor. If the reverification is successful, one or more tokens are purchased. If the reverification is unsuccessful, the transaction is rejected. The rejecting of the transaction can be due to the re-encoding of the wallet address having an incorrect private key signature.

A computer-implemented method for authentication is disclosed comprising: accessing a digital ledger using a centralized computing platform, wherein the digital ledger comprises a decentralized blockchain; determining a wallet address for a user, wherein the wallet address is associated with a digital token in the digital ledger; encoding a digitally mapped value based on the wallet address; and enabling access to the digital token, wherein the access is enabled using the encoding, the centralized computing platform, and the digital ledger. Embodiments include appending an entry to the digital ledger, wherein the entry includes the digitally mapped value. Other embodiments include updating a smart contract using the centralized computing platform, wherein the updating reflects the access enabled to the digital token. In embodiments, the digitally mapped value includes the wallet address, a transaction amount, and a type of digital currency. In embodiments, the digitally mapped value is hashed. Some embodiments include signing the digitally mapped value that is hashed. And in embodiments, the digital token is provided via the centralized computing platform from a digital purveyor.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
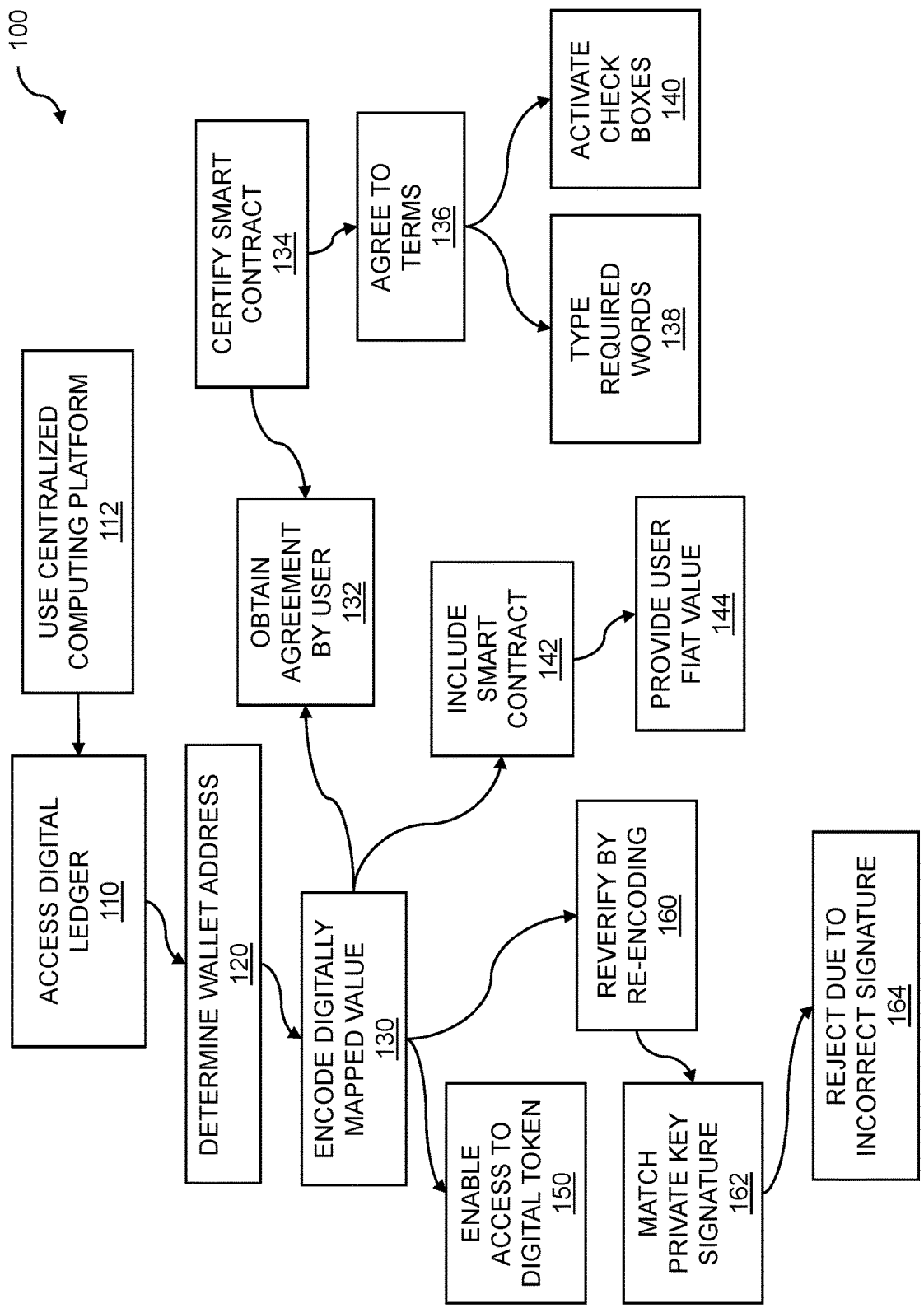
FIG. 1 is a flow diagram for hybrid digital ledger control with address encoding.

Disclosed hybrid digital ledger control with address encoding uses address encoding to ensure that transactions involving cryptocurrencies are accurately recorded. Hybrid digital ledger control is a technique that determines whether a user agrees to stipulations relating to a transaction, such as agreeing to terms of a smart contract. Further, the hybrid digital ledger control ensures that the user actually receives the goods or services that she or he intended to purchase. A hybrid digital ledger is based on a distributed ledger, where the distributed hybrid ledger is distributed across multiple processors called nodes. The nodes are widely distributed geographically. Geographic distribution can include multiple local sites, multiple regional sites, sites located across the globe, etc. The distributed hybrid ledger is replicated on the nodes that support the hybrid digital ledger. In order to add or remove items from the hybrid digital ledger, consensus must be attained from the nodes that participate in the hybrid digital ledger. Consensus is based on examining the digital data that is replicated, shared, and synchronized to the nodes. The nodes of the digital ledger share a peer-to-peer network so that a given node is able to communicate with the other nodes. The nodes attain an agreement regarding the validity of a transaction using one or more consensus algorithms. The consensus algorithms are used to identify which nodes require updating, and to ensure that the data is successfully replicated across the participating nodes. The hybrid digital ledger is used to record a variety of transactions such as making payments, receiving payments, providing goods and services, receiving goods and services, etc. The hybrid digital ledger is used to ensure that all transactions are recorded and maintained accurately. The hybrid digital ledger further ensures that transactions cannot be repeated, deleted, or altered. If the transactions are repeated, deleted, altered, or otherwise tampered with, the parties who are involved in the suspect transaction are notified. Further, the digital ledger can be observed by many witnesses. The witnesses can view the transactions and verify that the transactions are justified and accurate. The witnesses may be able to see only a given transaction and may not be able to see the parties participating in the transactions.

A user can choose to engage in a variety of online activities for which the user must make a payment. As mentioned above, the activities can include buying and selling goods and services online, engaging with a digital competition platform, sending money, receiving money, and so on. Each of these activities is considered a transaction in which a digital currency, such as a cryptocurrency, is transferred into or out of an account. The account or "digital wallet" is associated with a user. The digital wallet is a digital entity rather than a physical one. A user who wishes to engage in a transaction can use a cryptocurrency stored in her or his digital wallet. The digital wallet can contain one or more currencies such as cryptocurrencies that can be used for the various types of transactions. To ensure that cryptocurrencies are transferred legitimately, the transactions can be controlled by a smart contract. A smart contract is similar to its antecedent, the paper contract, in that parties agree to take certain actions such as providing goods and services, making payments, and so on. Unlike a paper contract, the user cannot affix his or her written signature to a smart contract. Instead, the user uses techniques that are appropriate to the digital medium. These techniques can include checking a box on a web form, clicking a radio button, entering text such as a unique code or answers to specific questions, and so on. The user can also use a digital signature, which is a verifiable string of numbers and characters that is unique to the user.

Stipulations can be added by a digital purveyor to enable a smart contract. A digital purveyor such as an online seller, an online bank, an operator of a digital competition platform, etc., can choose to add the stipulations to ensure that the transaction resulting from the smart contract is valid and appropriately agreed to by the user. The implementation of the smart contract describes the technique that is used to create the transaction. The smart contract may or may not have controls, such as legal controls or other requirements, to ensure that the user is the legitimate owner of the digital wallet. By adding one or more stipulations, the digital purveyor can require the user to actively, rather than passively, verify that she or he does want to engage in the smart contract and execute the transaction. The stipulations can include indicating that a user is eighteen years of age or older, that she or he accepts terms and conditions of the smart contract, that the user correctly answers security questions, and so on. With the stipulations actively accepted, the smart contract can be enabled. For example, the user can accept the stipulations, added by a digital purveyor, that enable a smart contract. The user can receive tokens that enable the transaction such as providing access to a digital competition platform.

Other safeguards can be put in place to ensure the validity of a user request for a transaction. The safeguards can be based on reverification of the user by the digital purveyor. Once the user agrees to the stipulations to enable the smart contract, the transaction is reverified. Various techniques such as re-encoding the wallet address of the user can be used for the reverification. The digitally mapped value that results from the re-encoding of the wallet address of the user can be compared to the digitally mapped value previously determined for the user wallet address. In addition to re-encoding the wallet address, the re-encoding includes matching a private key signature. The private key signature is based on the private key provided by the digital purveyor. The private key signature for the smart contract can be compared to the private key signature provided by the digital purveyor. Authentication occurs when both the re-encoding of the wallet address for the user matches the encoded wallet address, and the re-encoding matches a private key signature to the private key signature of the digital purveyor. The authentication is then successful and the transaction proceeds. If the authentication based on the reverifying fails, then the transaction is rejected.

Furthermore, the digital purveyor can use a public key belonging to the digital purveyor to sign the digitally mapped value. The public key can also be mapped to an Ethereum™ address. The digitally mapped value can include the hashed address, key words, etc., from the user, that were used in creating the digital signature. The user can then submit the digital signature and the signed data in a transaction to the smart contract. The smart contract can check to ensure that the signed data matches expectations and that the public key recovered from the digital signature matches that of the digital purveyor, of which it has a record.

FIG. 1 is a flow diagram for hybrid digital ledger control with address encoding. The digital ledger is accessed using a centralized computing platform. The centralized computing platform can be managed by a digital purveyor. The digital ledger comprises a decentralized blockchain. The decentralized blockchain can be based on a cryptocurrency, a digital currency, etc. The decentralized blockchain can include Ethereum™ A wallet address, such as the address of a digital wallet, can be determined for a user. The wallet address is associated with a digital token in the digital ledger. The digital wallet can include cryptocurrencies that can be used to purchase tokens, where the tokens can be used to engage with an online competition platform. The flow 100 includes accessing a digital ledger 110. The digital ledger can include one or more digital transactions, where the digital transactions can be based on digital currencies. The digital transactions can include credits, debits, balance verifications, and so on. The accessing can include using a centralized computing platform 112. The centralized computing platform can be operated or managed by an entity such as a digital purveyor. The digital ledger comprises a decentralized blockchain, where the decentralized blockchain can be based on one or more digital currencies. The digital currencies can include one or more cryptocurrencies. In embodiments, the cryptocurrency includes Ethereum™. Other examples of cryptocurrencies include Bitcoin™, Dash™, Monero™, etc. The flow 100 includes determining a wallet address 120 for a user, where the wallet address can be associated with a cryptocurrency in the digital ledger. The wallet address for the user can be associated with one or more digital currencies, one or more cryptocurrencies, and so on. The cryptocurrencies can be used to purchase goods and services, to transfer funds from a first wallet address to a second wallet address, to allow participation in activities on a centralized computing platform, and so on. The centralized computing platform can include a digital competition platform.

The flow 100 includes encoding a digitally mapped value 130 based on the wallet address. The digitally mapped value can include a number, an alphanumeric string, a code, a key, and so on. In embodiments, the digitally mapped value is uniquely coded to access the wallet address. The wallet address can include a digital wallet address associated with a user. Various techniques for the encoding of the digitally mapped value can be used. The encoding can be used to ensure integrity or veracity of the data, to conceal the data, to secure or protect the data, and so on. In embodiments, the encoding comprises hashing the wallet address. As discussed throughout, the hashing can be accomplished using an algorithm or function using a hash function. The hash function can take data of an arbitrary size and convert the data to a fixed-length string. The hash function can be a one-way function, where the fixed-length string to which the arbitrary size data was converted cannot be used to recreate the arbitrary size data. In other embodiments, the digitally mapped value includes the wallet address, a transaction amount, and a type of digital currency.

In the flow 100, the encoding further comprises obtaining an agreement by the user 132 to enable the smart contract. The agreement by the user can be reflected in an entry in the digital ledger. The active agreement by the user can be required to purchase digital tokens. The digital tokens can be required to participate in a digital competition platform. The digital tokens can be purchased using a credit card, a wire or bank transfer, and so on. In embodiments, the smart contract can be enabled to purchase digital tokens using a cryptocurrency. The cryptocurrency can include Ether™, Bitcoin™, Monero™, and the like. In embodiments, the smart contract includes preapproval to send cryptocurrency.

In the flow 100, the agreement by the user includes certifying the smart contract 134. Various techniques can be used to certify the smart contract. The certifying can include taking an action such as opting in or opting out, entering a code, answering security questions, providing biometric data, and so on. As with a standard or "traditional" contract, in embodiments, the certifying includes agreeing to specific terms 136 that enable the smart contract. While for a paper contract, agreeing to specific terms can be accomplished by providing a signature, initials, etc., agreeing to specific terms of a smart contract can require a user to perform one or more online actions. In embodiments, the agreeing to specific terms can include typing required words 138 from the smart contract into a web-enabled interface. The required words can include keywords, codes, answers to the security questions, etc. The web-enabled interface can be accessed using a web browser. In other embodiments, the agreeing to specific terms can include activating two or more checkboxes 140 from the smart contract within a web-enabled interface. The checkboxes can be displayed next to terms of the smart contract, can include solving a Captcha™, and the like.

In the flow 100, the encoding further comprises inclusion of a smart contract 142. As discussed, a smart contract, which can include a digital version of a contract, can be used to enforce, verify, negotiate, or otherwise facilitate the contract. The smart contract can be used for buying or selling goods or services, participating in a digital competition platform, and the like. The smart contract can include making a payment to the user. The payment can include a digital token, a unit of cryptocurrency, and the like. The payment, which can include a balance in a digital wallet, can be converted to "real" money. Further embodiments include mapping, by the digital purveyor, the digital token to a fiat value 144. A fiat value can be based on a currency such as dollars, euros, pounds, rubles, etc.

The flow 100 includes enabling access to the digital token 150. The enabling access to the digital token can enable a user to engage in a transaction such as making a purchase, transferring funds, etc. In embodiments, the enabling access to the digital token can provide access to a digital competition platform. The user's access to the token is enabled using the encoding, the centralized computing platform, and the digital ledger. The flow 100 further includes reverifying the digitally mapped value by re-encoding 160 the wallet address. The re-encoding can be performed using the various techniques described previously. In embodiments, the re-encoding includes matching a private key signature 162. The re-encoding generates a key signature which can be compared to the "known good" or reference private key signature. The private signature can be provided by a digital purveyor, an online key repository, and the like. The matching the key signature generated by the re-encoding to the private key signature can succeed or fail. The flow 100 further includes rejecting a transaction if the re-encoding of the wallet address has an incorrect private key signature 164. When a mismatch occurs, various actions can be taken. The re-encoding may be performed again, the transaction can be locked, the transaction can be flagged as a potentially fraudulent transaction, and the like.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
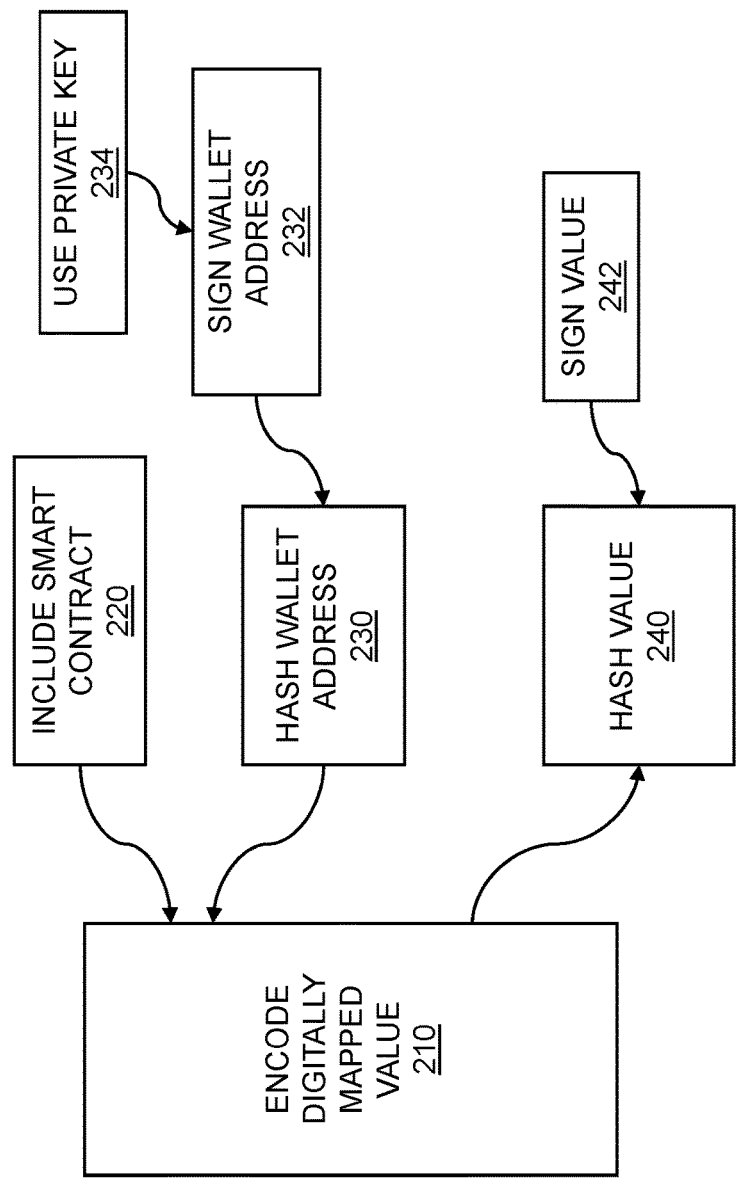
FIG. 2 is a flow diagram for digitally mapped value encoding.

FIG. 2 is a flow diagram for digitally mapped value encoding. Hybrid digital ledger control with address encoding includes encoding a digitally mapped value based on a wallet address. The wallet address is associated with a user who may wish to access a digital competition platform to participate in games, eSports, and the like. A digital ledger is accessed using a centralized computing platform, where the digital ledger includes a decentralized blockchain. A wallet address for a user is determined, where the wallet address is associated with a digital token in the digital ledger. A digitally mapped value is encoded based on the wallet address, and access to the digital token is enabled. The access is enabled using the encoding, the centralized computing platform, and the digital ledger.

The flow 200 includes encoding a digitally mapped value 210 based on the wallet address. The digitally mapped value can be based on an address, a key, a string, code provided by a user, and so on. The encoding can include associating one or more code objects, where an object can include a function, a data structure, a variable, an algorithm, and the like. The flow 200 further comprises inclusion of a smart contract 220. A smart contract can correspond to digital version of a traditional paper contract. The smart contract can include a computer protocol or technique that enables negotiation or enforcement of a contract, verification of the contract, and so on. In the flow 200, the encoding includes hashing the wallet address 230. The hashing of the wallet address, such as a digital wallet address, can be based on a hash function. A function used for the hashing the wallet address can be based on a cyclic redundancy check (CRC), a checksum (CS), a universal hash function, a cryptographic or non-cryptographic function, and other techniques. In the flow 200, the encoding further comprises signing the wallet address that was hashed 232. The signing the wallet address can be based on using a digital signature, a key, a string, a code, and so on. In embodiments, the signing is performed using a private key 234 from a digital purveyor. The private key can include a private key from a private key/public key set. The digital purveyor can include a key clearing house. The digital purveyor can operate or manage the centralized computing platform. The centralized computing platform can include a digital competition platform.

Various operations can be performed on the digitally mapped value that is encoded. The operations can include storing, comparing, verifying, re-encoding, reverifying, and so on. In the flow 200, the digitally mapped value is hashed 240. As described above, the hashing of the digitally mapped value can be based on a CRC technique, a CS technique, a universal function, cryptographic or non-cryptographic techniques, etc. The flow 200 includes signing the digitally mapped value that is hashed 242. The signing the digitally mapped value can be used to unlock functions of the smart contract, such as deposit or withdrawal functions. The hashed digitally mapped value can be signed using a digital signature, a passphrase, a code, an alphanumeric string, and so on. In embodiments, the hashed digitally mapped value is signed using a private key. In embodiments, the private key that can be used to sign the hashed digitally mapped value can be provided from a digital purveyor. The purveyor can include the purveyor of a digital competition platform. In embodiments, the private key can be used to store digital tokens in the smart contract and to map the tokens to database credits. The stored and mapped tokens can be used on the centralized platform, such as a digital competition platform.

Figure 3:
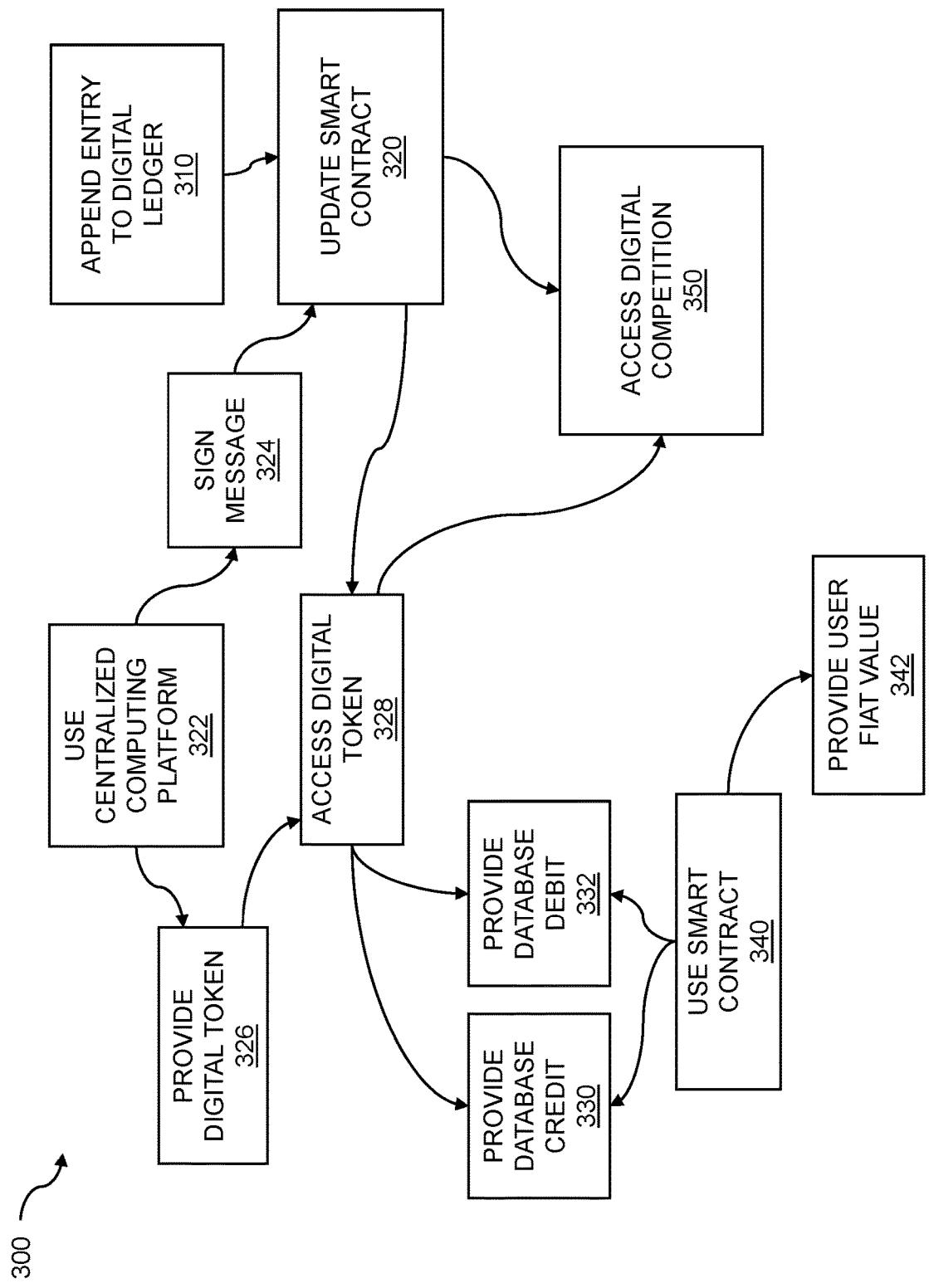
FIG. 3 is a flow diagram for digital ledger usage.

FIG. 3 is a flow diagram for digital ledger usage. The digital ledger, such as the digital ledger described herein, can be used to track digital transactions. The digital transactions can be conducted online and can be used for various purposes such as participating in activities conducted on a digital competition platform. Digital ledger usage includes hybrid digital ledger control with address encoding. A digital ledger is accessed using a centralized computing platform. The digital ledger comprises a decentralized blockchain. A wallet address is determined for a user. The determined wallet address is associated with a digital token in the digital ledger. A digitally mapped value is encoded based on the wallet address, and access to the digital token is enabled. The access to the digital token is enabled using the encoding, the centralized computing platform, and the digital ledger. The flow 300 includes appending an entry to the digital ledger 310. As discussed throughout, the digital ledger can include a blockchain, where the blockchain can include a decentralized blockchain. The blockchain can be based on a decentralized blockchain that enables a type of cryptocurrency. In embodiments, the decentralized blockchain can include Ethereum™. Other blockchains such as blockchains associated with Bitcoin™, Monero™, and so on can be used. The transaction that is appended can include a credit, a debit, a database balance inquiry, and so on.

The flow 300 includes updating a smart contract 320. The smart contract can be updated based on accepting the smart contract, rejecting the smart contract, verifying a digitally mapped value, reverifying a digitally mapped value, comparing an encoded value or a re-encoded value to a private key signature, and so on. The updating the smart contract can be accomplished using the centralized computing platform 322. The centralized computing platform can be managed by a digital purveyor. The updating can reflect the access enabled to the digital token, where the digital token is associated with the digital ledger. The updating of the smart contract can further include signing, by the centralized computing platform, a message 324 to unlock functions in a smart contract. The message can include an encoded message, a string of alphanumeric characters for one-time usage, a digital key, etc. The functions that can be unlocked can correspond one-to-one with a database credit, a database debit, or a database balance inquiry. The functions can be based on a value. In embodiments, the database functions are reflective of a value contained in the digital ledger. The value can be based on a digital token, a cryptocurrency, etc. The digital token 326 is provided via the centralized computing platform from the digital purveyor. The digital token can be provided to the user. The digital token can be provided within the centralized computing platform managed on the digital purveyor, transferred to a digital wallet address for the user, and the like. The flow 300 includes enabling access to the digital token 328. The access to the digital token can be based on encoding the digitally mapped value based on the wallet address, the centralized computing platform, and the digital ledger. The access to the digital token can be based on updating the smart contract. In embodiments, the centralized computing platform can ensure that sum of the platform balances is equal to the digital ledger, which provides a safeguard and check for the integrity of the system. In embodiments, the centralized computing platform provides a balance associated with the wallet address of the user. In some embodiments, signing a message, by the centralized computing platform, unlocks functions in a smart contract. In embodiments, the functions correspond one-to-one with a database credit, a database debit, or a database balance inquiry.

The digital token can be accessed via the centralized computing platform using a cryptocurrency such as Ether™. The digital token can provide a database credit 330. The database credit can be reflected in the digital ledger, where the digital ledger uses the centralized computing platform managed by the digital purveyor. The database credit can be enabled using a smart contract 340. As described throughout, the smart contract can enable encoding, transactions relating to tokens or cryptocurrencies, and the like. The enabling access to the digital token can provide a database debit 332. The database debit can be applied against the wallet address of the user. The database debit can be enabled using the smart contract 340. The smart contract can accomplish other functions relating to accessing the digital token. Further embodiments include mapping, by the digital purveyor, the digital token to a fiat value. The fiat value can be based on fiat money. Fiat money can refer to a paper currency that cannot be converted to a material of value such as gold or silver. Fiat money can be made legal tender based on a degree from a government or another entity such as a bank that can issue the fiat money. Further embodiments include providing the fiat value 342 to the user. In the flow 300, the digital token provides access to, or enablement for, a digital competition platform 350. The digital competition platform can provide various types of contests, where the contest can include games that involve competitions between individuals or teams, eSports, games of chance, and the like.

Figure 4:
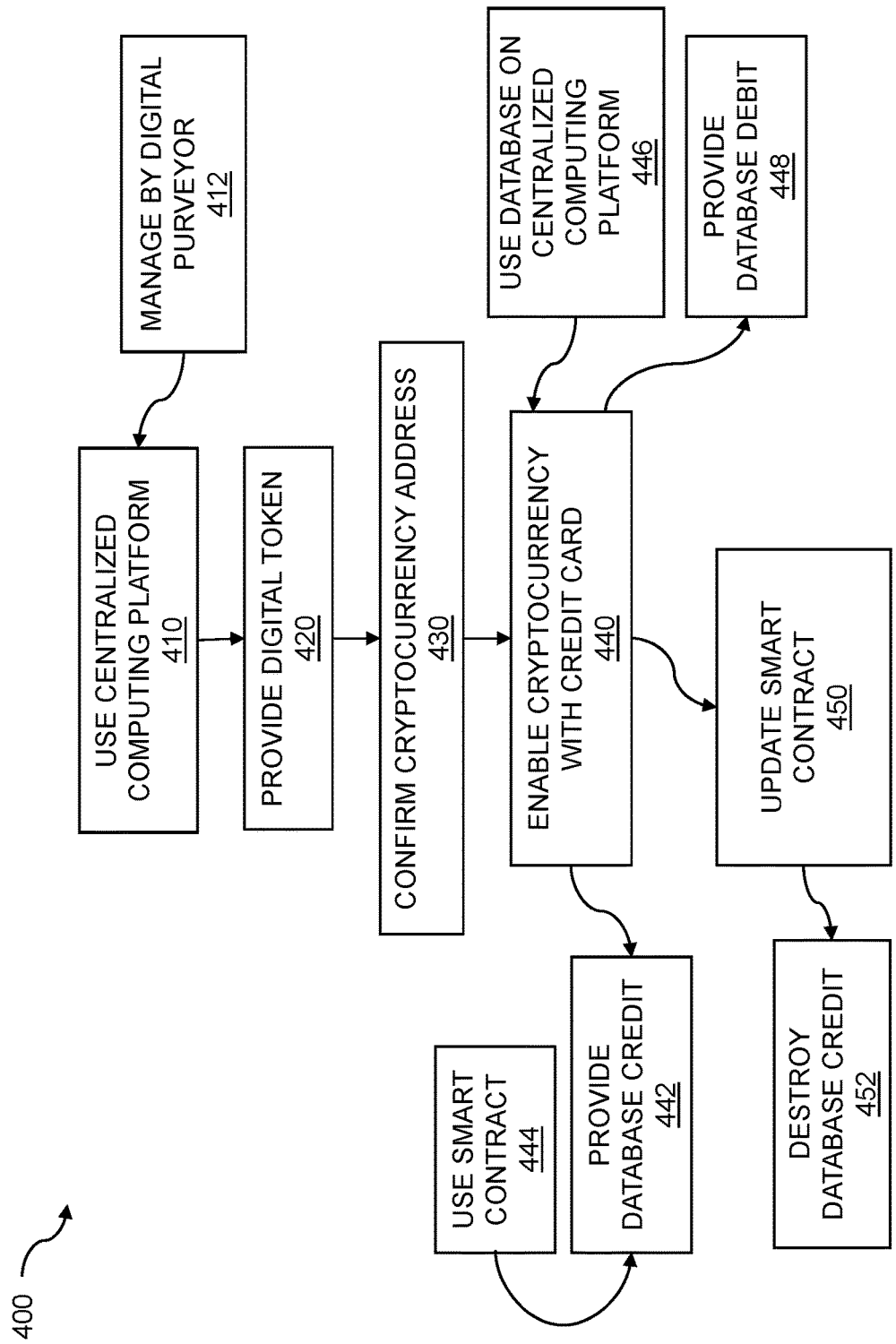
FIG. 4 is a flow diagram for accessing a digital token.

FIG. 4 is a flow diagram for accessing a digital token. Digital tokens can be used for changing funds, buying or selling goods and services, participating in online activities such as a digital competition, and so on. A digital token can be accessed using hybrid ledger control with address encoding. A digital ledger is accessed using a centralized computing platform, where the digital ledger includes a decentralized blockchain. A wallet address for a user is determined, where the wallet address is associated with a digital token in the digital ledger. A digitally mapped value is encoded based on the wallet address, and access to the digital token is enabled, where the access is enabled using the encoding, the centralized computing platform, and the digital ledger.

The flow 400 includes using a centralized computing platform 410. The centralized computing platform can be located in a datacenter, onsite at the location of a digital purveyor, etc., and can be accessible over a computer network such as the Internet. The centralized computing platform can be managed by the digital purveyor 412. Managing the centralized computing platform can include supporting the hardware and software of the centralized computing platform, managing access to the computing platform, and so on. Access to the platform can be based on a membership, a subscription, a token, and the like. The computing platform can include a digital competition platform. The flow includes providing a digital token 420. The digital token that is provided can be purchased, spent, collected, etc. Further embodiments include obtaining an agreement by the user to enable a smart contract. The enabling the smart contract can include clicking radio buttons, typing keywords or codes, and so on. The agreement can be required to purchase digital tokens that can be provided. The digital token can be accessed via the centralized computing platform using a cryptocurrency. The cryptocurrency can include Ether™, Bitcoin™, Monero™, and the like.

In the flow 400, the centralized computing platform confirms a cryptocurrency address 430. The cryptocurrency address can include a wallet address for a user, where the wallet address can be associated with a digital token in the digital ledger. The cryptocurrency address can include an identifier, where the identifier can include a string of alphanumeric characters. In embodiments, the string of alphanumeric characters can include a number of characters from 26 characters to 35 characters. Other numbers of alphanumeric characters may also be used. In the flow 400, the cryptocurrency is enabled using a credit card 440. The cryptocurrency can also be enabled using a bank transfer or wire transfer, or other technique for transferring funds. The cryptocurrency can be enabled using an online payment platform such as PayPal™. In embodiments, the enabling provides a database credit 442. A certain amount of database credit can be allocated for each token that is provided. Providing more tokens can enable more database credit. In embodiments, the database credit can be enabled using a smart contract 444. As discussed above, the smart contract can be enabled by requiring a user to perform tasks such as clicking, typing, etc. The smart contract can stipulate an amount of database credit. In embodiments, the cryptocurrency can be enabled using a database on the centralized computing platform. The database on the centralized computing platform 446 can be used to verify that the cryptocurrency exists, that it is available for providing a database credit, and the like. The database can be used to verify that the cryptocurrency can be transferred from a first digital wallet address to a second digital wallet address. In the flow 400, the enabling provides a database debit 448. A database debit can be applied to the first digital wallet address, a database credit applied to the second digital wallet address, etc.

The flow 400 includes updating a smart contract 450 associated with a database credit for the user. The updating the smart contract can include executing the contract, cancelling the contract, and so on. In embodiments, the updating includes destroying the database credit transaction 452 of the smart contract. The destroying the database credit transaction can occur due to the contract being cancelled, unavailability of cryptocurrency for the transaction, the user not agreeing to the contract, and the like. The destroying the database credit transaction can be based on transferring the credit from a first digital wallet address to a second digital wallet address.

Figure 5:
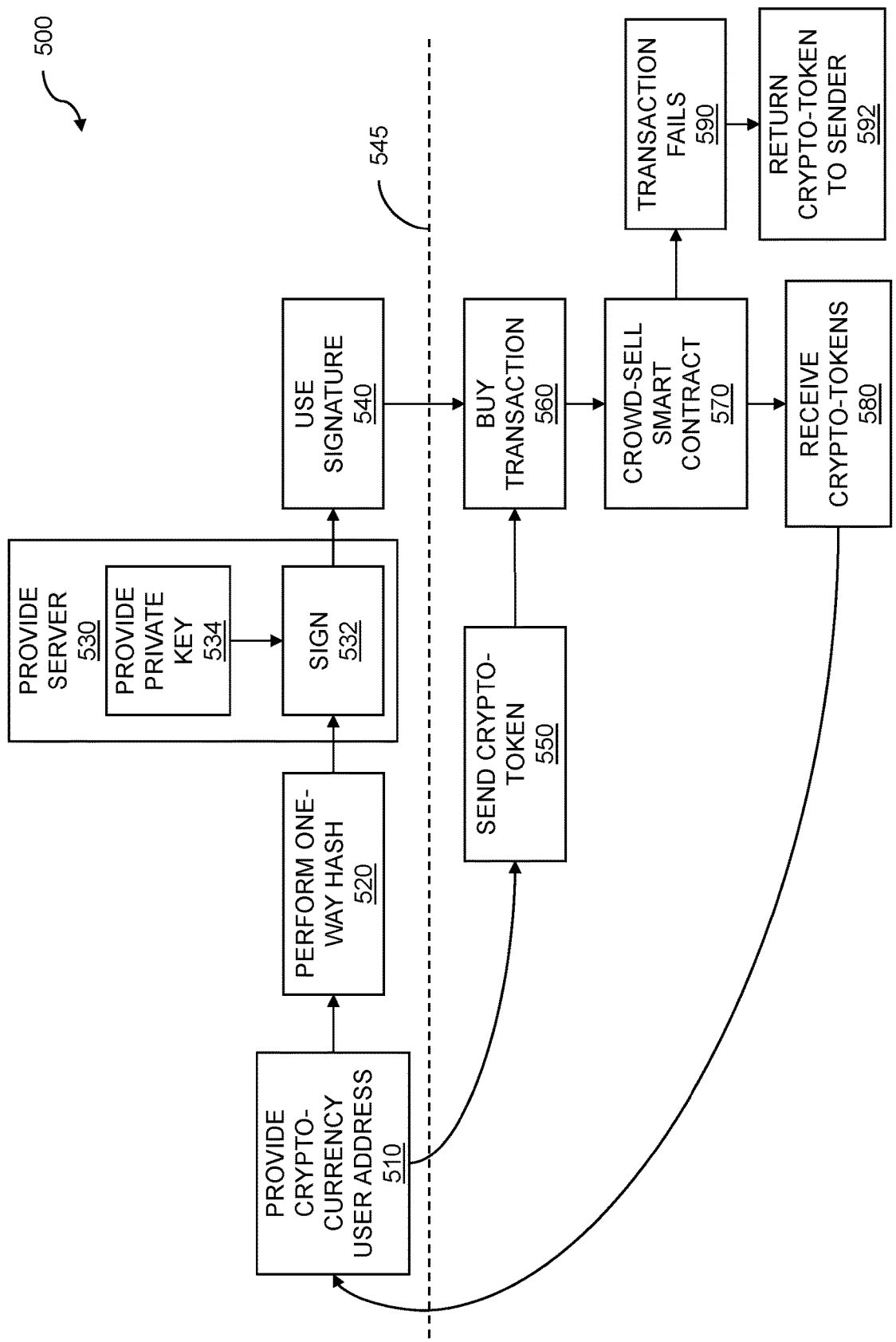
FIG. 5 is a flow diagram for crowd-selling a smart contract.

FIG. 5 is a flow diagram for crowd-selling a smart contract. A smart contract can include a distributed digital ledger such as a blockchain. The blockchain can include a decentralized blockchain. A smart contract can be included in encoding a digitally mapped value based on a wallet address. The smart contract can be crowd-sold based on hybrid digital ledger control with address encoding. A wallet address for a user is determined. The wallet address is associated with a digital token in the digital ledger. A digitally mapped value is encoded based on the wallet address, where the encoding can further include using a private key to generate the digitally mapped value. The private key can be from a digital purveyor. Access to the digital token is enabled. The access is enabled using the encoding, the centralized computing platform, and the digital ledger. The digitally mapped value can be reverified by re-encoding the wallet address. An entry is appended to the digital ledger, where the entry includes the digitally mapped value. A transaction can be rejected due to the re-encoding of the wallet address having an incorrect private key signature, based on non-authentication of the digitally mapped value.

Crowd-selling is a funding model in which a prototype good or service is offered for free in return for a donation made to the one who is offering the prototype good or service. The donations received are used to complete development of the good or service, to buy manufacturing services, and so on. The donor can receive the prototype or "free perk" when production begins. The level of the perk can be based on the level of the donation made. If sufficient funds for development, manufacturing, etc. are not received, then the free perks are not distributed to the donors. Examples of online crowd-selling sites include Kickstarter™ GoFundMe™, Indiegogo™, etc. A digital purveyor can provide the crowd-selling.

The flow 500 can include providing a cryptocurrency user address 510. The user address can include a cryptocurrency account, a digital wallet, and so on. The flow 500 includes performing a one-way hash 520 of the cryptocurrency user address. The one-way hash can include encoding the cryptocurrency user, or digital wallet, address. In embodiments, the encoding comprises hashing the wallet address. The results of the encoding can include a digitally mapped value. The flow 500 includes providing a server 530 to continue the encoding of the digitally mapped value. The server 530 can sign 532 the digitally mapped value. Embodiments include signing the wallet address that was hashed, where the signing is performed using a private key 534 from a digital purveyor. The private key can be known only to the digital purveyor. In embodiments, the performing a one-way hash 520 and the signing 532 are performed on the same server. The flow 500 includes enabling the smart contract by using the signature 540. The smart contract is thus preauthorized for a later transaction. The later transaction can occur almost immediately after the preauthorization or at a significantly later time, such as a week or two later when a crowd sale occurs. The steps in flow 500 occurring above dotted line 545 can therefore occur during the initial, preauthorizing phase of the digital ledger authentication.

The flow 500 includes steps shown below dotted line 545, which can occur after a preauthorization of a smart contract occurs. The flow 500 includes sending a crypto-token 550. The crypto-token can include a digital token. The digital token can be provided by a digital purveyor. In embodiments, the digital purveyor can provide digital tokens. A digital token can be used to purchase goods and services, to exchange funds, and so on. In embodiments, one or more digital tokens provide access to a digital competition platform, such as an eSports platform. The flow 500 includes executing a buy transaction 560. A transaction can include obtaining an agreement by the user to enable a smart contract. Agreement can include checking a box, clicking a radio button, entering text into a field of a web form, and so on. The transaction can include purchasing the crypto-token. In embodiments, the agreement can be required to purchase the one or more digital tokens. The purchasing of the one or more crypto-tokens can be performed using a variety of techniques. In embodiments, the smart contract is enabled to purchase digital tokens using the cryptocurrency. In embodiments, the buying a transaction 560 includes reverification of the signature sent with the transaction request. In embodiments, after a smart contract-encoded start time, the user can send cryptocurrency and the preauthorization signature and receive digital tokens.

The flow 500 includes crowd-selling the smart contract 570. The crowd-selling can include crowd approval of the smart contract, crowd purchasing of digital tokens, and so on. The flow 500 includes receiving crypto-tokens 580. Cryptocurrency from the user address such as the digital wallet are used to pay for the crypto-tokens, and the crypto-tokens are transferred to the cryptocurrency user address 510. The flow 500 includes handling of failed transactions 590. A transaction can fail when the re-encoding of the wallet address has an incorrect private key signature. The transaction can fail due to a failure of crowd-selling. The flow 500 includes returning the crypto-token to the sender 592. Since no cryptocurrency was exchanged to pay for the crypto-token, then the crypto-token can be returned to the owner of the crypto-token. The owner of the crypto-token can include a digital purveyor. In embodiments, all of the steps in the flow 500 can be implemented on, or enabled by, a server 530. Various steps in the flow 500 may be changed in order, repeated, omitted, or the like without departing from the disclosed concepts. Various embodiments of the flow 500 can be included in a computer program product embodied in a non-transitory computer readable medium that includes code executable by one or more processors.

Figure 6:
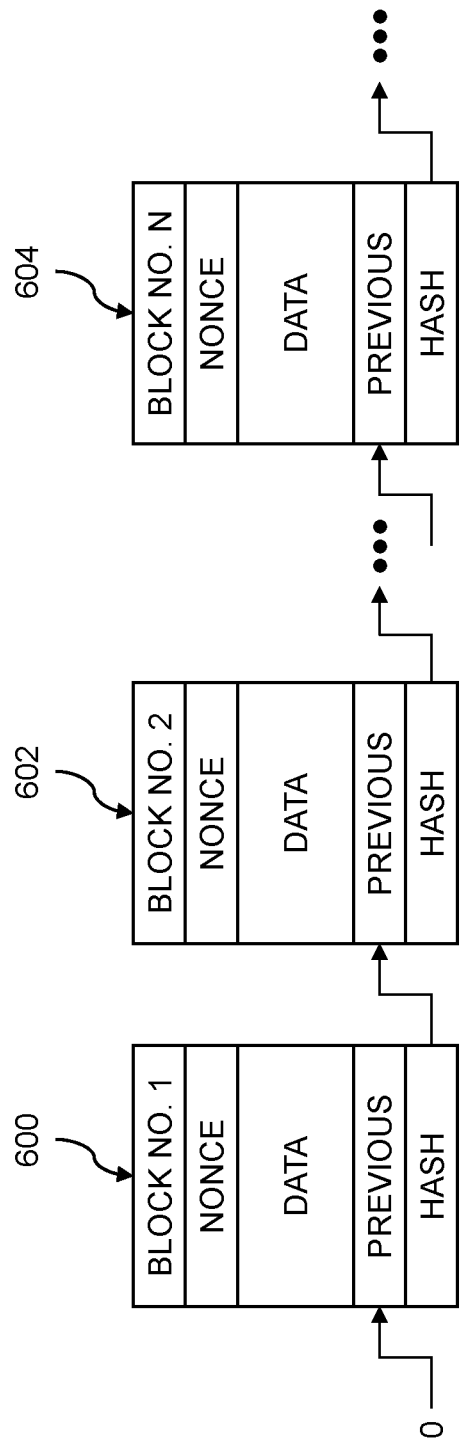
FIG. 6 illustrates a blockchain.

FIG. 6 illustrates a blockchain. A digital ledger can include a blockchain, where the blockchain can include a decentralized blockchain. Authentication such as digital ledger authentication can be based on using address encoding. A digital ledger on a centralized computing platform is accessed, where the digital ledger can include a decentralized blockchain. A wallet address for a user is determined, where the wallet address is associated with a digital token in the digital ledger. A digitally mapped value is encoded based on the wallet address. The encoding can include hashing the wallet address. The encoding can include signing the wallet address that was hashed, where the signing is performed using a private key from a digital purveyor. The encoding can comprise using a private key to generate the digitally mapped value. The encoding can further comprise inclusion of a smart contract. Access to the digital token is enabled, where the access is enabled using the encoding, the centralized computing platform, and the digital ledger. An entry is appended to the digital ledger, where the entry includes the digitally mapped value.

Online transactions can be secured by using a blockchain such as a decentralized blockchain. A blockchain is a digital ledger that supports the recording of digital transactions such as online transactions. The blockchain records the online transactions as a decentralized digital ledger. The digital ledger is widely distributed, where the wide distribution can include global distribution. The registered transactions are hashed and stored such that the transactions cannot be altered, modified, changed, corrupted, tampered with, etc., after the transactions have been recorded, thus securing the registered transactions. Veracity of a registered transaction is authenticated based on collaboration among systems that support the decentralized digital ledger. The authentication is based on verifying a hashchain for the transaction. The blockchain is based on a hashchain within a hashchain.

A blockchain can include two types of records. The blockchain records can include blocks and transactions. A block can include transactions, where the transactions have been determined to be valid. The blocks can be organized into a Merkle tree, which will be discussed in greater detail later. The Merkle tree can be formed based on hashing the transactions and encoding the hashed transactions. A block in the blockchain includes a hash of the previous block in the blockchain. A blockchain can resemble a linked list in that the blocks of the chain are linked together. The notable difference between a linked list and a blockchain is that the reference to the previous block is not a pointer but rather a hash. Adding blocks to the blockchain is an iterative technique. The hash of the current block depends on the hash of the previous block, the hash of the previous block in the chain depends on the hash of the previous block to that block, and so on. A result of the iterative technique of the blockchain is that data stored in a blockchain can be considered secure. An example of security of data stored in a blockchain is digital currency. Since each block in a blockchain depends on hashes that are based on previous blocks in the blockchain, then a change of data in one block of the blockchain invalidates the hashes of all subsequent blocks in the blockchain. Digital currency can be spent once and cannot be infinitely reproduced and/or spent. That is, a transaction indicating that a particular unit of digital currency was used in an exchange creates a hash. If the unit of digital currency were to be used again, then the hash generated by the new transaction would invalidate all subsequent blocks in the blockchain, indicating that an attempt was made to reuse the unit of digital currency.

At times, validation can occur concurrently for separate blocks. The result of concurrent validation can be to create a fork, where the fork can remain temporarily. Recall that the blockchain is a distributed digital ledger that can be distributed widely across computer systems. The temporary fork can result in multiple histories of the blockchain since updates to the blockchain might not have completely disseminated across the distributed digital ledger. Algorithms, code segments, apps, applications, programs, etc. can be used to score the various versions of the history of the blockchain. Versions of history of the blockchain that score the highest can be chosen over versions of the history of the blockchain with lower scores. The lower scored versions of the history might not be selected for inclusion in the blockchain. These versions that are not selected for inclusion are called orphan blocks. Decisions about which histories of the blockchain score the highest are determined by peers in the distributed digital ledger. The peers use a particular algorithm, code segment, etc. to determine the scoring.

Updates to the blockchain are distributed across the peers. A peer can receive a version of the history of the blockchain with a higher score. The higher score can result from a block being added to the blockchain. The peer can add the new block to the version of the blockchain stored by the peer, overwrite the existing version of the blockchain, etc. A new score can be determined. The peer can retransmit the improved blockchain to their peers.

A blockchain is shown in FIG. 6. The blockchain includes a first block, block 1 600, a second block, block 2 602, and an Nth block, block N 604. While three blocks are shown, in practice any number of blocks can be included in the blockchain. In practice, the number of blocks in the blockchain continues to increase. A block such as the block 600 includes a block number, a nonce, data, a hash received from the previous block, and a hash generated for this block. Since the block 600 is the first block in the blockchain, there is no previous block. For this first block of the blockchain, the hash from the previous block is zero. The nonce is a "onetime" value that is determined for the block. The nonce is a value that is determined based on the data, the previous hash, the hash for the current block, etc. If any information in the block were to be changed, such as the data, the previous hash, the block hash, etc., then the nonce value is no longer valid for the block. The nonce can be used to indicate that the block has been tampered with, corrupted, or otherwise changed. If there is a valid reason to change a value in the block, such as updating the data in the block, then a new nonce value is calculated. Determination of the new nonce value can be based on the hash for the block or other criteria. Subsequent blocks in the blockchain, such as the block 2 602 and the block N 604, contain fields similar to those fields of the first block 600. The previous hash value of the block 602 is set to the hash value of the block 600. The previous hash value of the block 604, block N, is set to the hash value for a block N−1 (not shown).

A change of value in one block of a blockchain causes the validity of all subsequent blocks to be negated. The invalidity of all subsequent blocks results from the hash of a given block being dependent on the hash of a previous block. That is, even though data in a given block such as the block 602 has not changed, the validity of the block 602 was based on the validity of its previous block, 600. If the data in the block 600 were to be changed, and the nonce not updated, then the block 602 is no longer valid since the hash for the block 600 changes. Since the validity of a given block depends on the validity of previous blocks, then the block 604 becomes invalid, and so on. By looking at any block in the blockchain, it can be determined whether the data in that block is valid. If the data in the block 600 were changed legitimately, then a new nonce value can be generated to revalidate the block 600. The result of regenerating the nonce value for the block 600 is that all subsequent blocks in the blockchain can remain valid.

Figure 7:
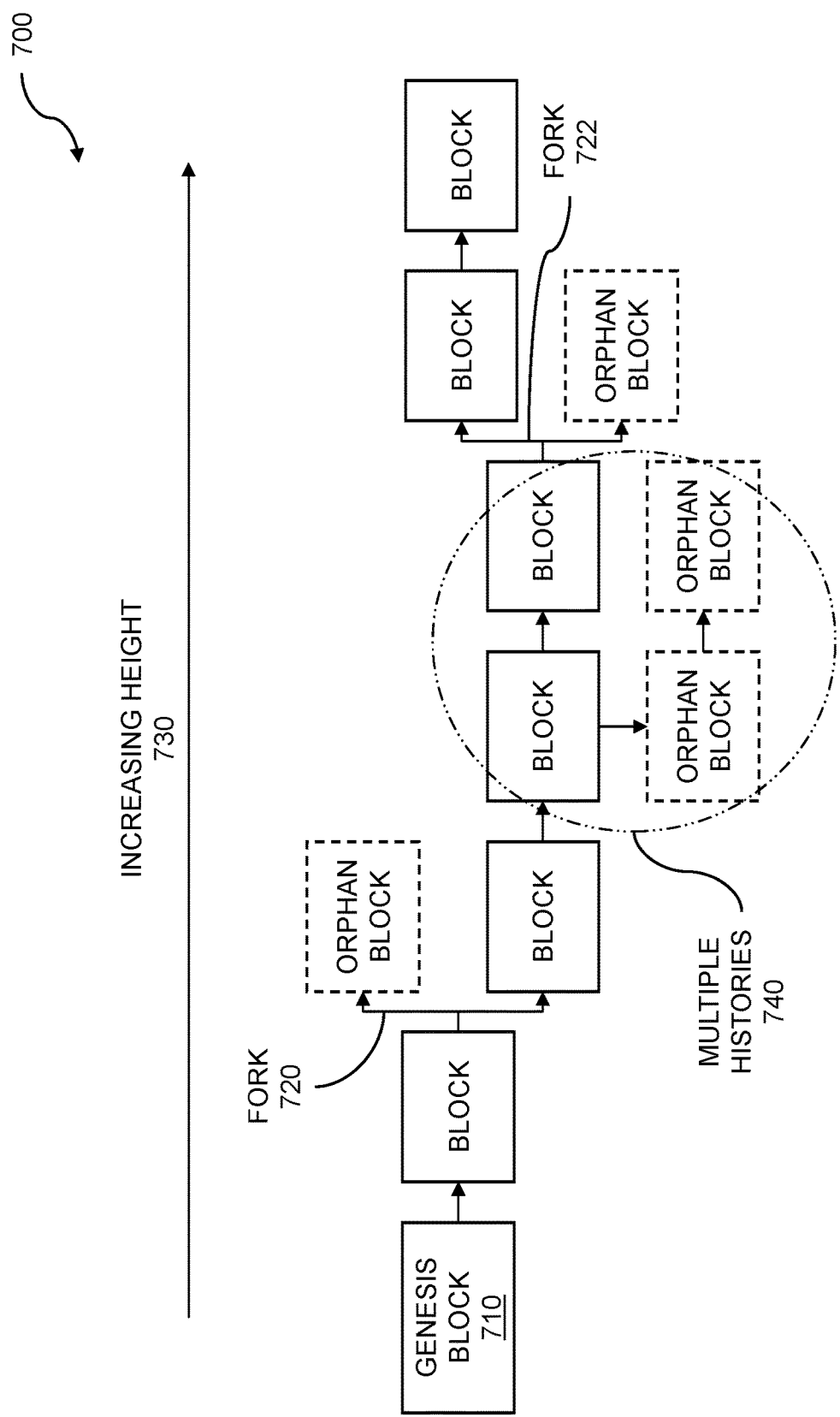
FIG. 7 illustrates a blockchain over time.

FIG. 7 illustrates a blockchain over time. A digital ledger such as a hybrid digital ledger can include a blockchain. The blockchain can include a decentralized blockchain. Hybrid digital ledger control can use address encoding. A wallet address for a user is determined. The wallet address is associated with a digital token in the digital ledger. A digitally mapped value is encoded based on the wallet address, a transaction amount, and a type of digital currency. The encoding can further include using a private key to generate the digitally mapped value. The private key can be from a digital purveyor. Access to the digital token is enabled, where the access is enabled using the encoding, the centralized computing platform, and the digital ledger. An entry is appended to the digital ledger, where the entry includes the digitally mapped value. The digitally mapped value is reverified by re-encoding the wallet address. A transaction can be rejected due to the re-encoding of the wallet address having an incorrect private key signature.

Online transactions can be secured by using a blockchain such as decentralized blockchain. A blockchain is a digital ledger that supports the recording of digital transactions such as online transactions. The blockchain records the online transactions as a decentralized digital ledger. The digital ledger is widely distributed, where the wide distribution can include global distribution. The registered transactions are hashed and stored such that the transactions cannot be altered, modified, changed, corrupted, tampered with, etc., without detection after the transactions have been recorded, thus securing the registered transactions. Veracity of a registered transaction is authenticated based on collaboration among systems that support the decentralized digital ledger. The authentication is based on verifying a hashchain for the transaction. The blockchain is based on a hashchain within a hashchain.

The illustration 700 shows a blockchain including a genesis block 710 that forms the root of a blockchain. Blocks can be added to the blockchain over time. The addition of blocks can be described as increasing the height 730 of the blockchain. Addition of a new block to the blockchain can be based on validation. Recall that the blockchain is a distributed digital ledger. At times, validation can occur concurrently for separate blocks. The result of concurrent validation can be to create a fork such as a fork 720 and a fork 722, where the fork can remain temporarily. The temporary fork can result in multiple histories of the blockchain, such as multiple histories 740. The multiple histories can occur since updates to the blockchain might not have completely disseminated across the distributed digital ledger. The various versions of the histories of the blockchain are scored, as described elsewhere. The versions of history of the blockchain that score the highest can be chosen over versions of the history of the blockchain with lower scores. The lower scored versions of the history might not be selected for inclusion in the blockchain and are orphaned, as shown in the illustration 700 by the orphan blocks. Decisions about which histories of the blockchain score the highest are determined by peers in the distributed digital ledger. Updates to the blockchain are distributed across the peers. A peer can receive a version of the history of the blockchain with a higher score. The higher score can be due to a block being added to the blockchain. The peer can add the new block to the version of the blockchain stored by the peer, overwrite the existing version of the blockchain, etc. A new score can be determined. The peer can retransmit the improved blockchain to its peers.

Figure 8:
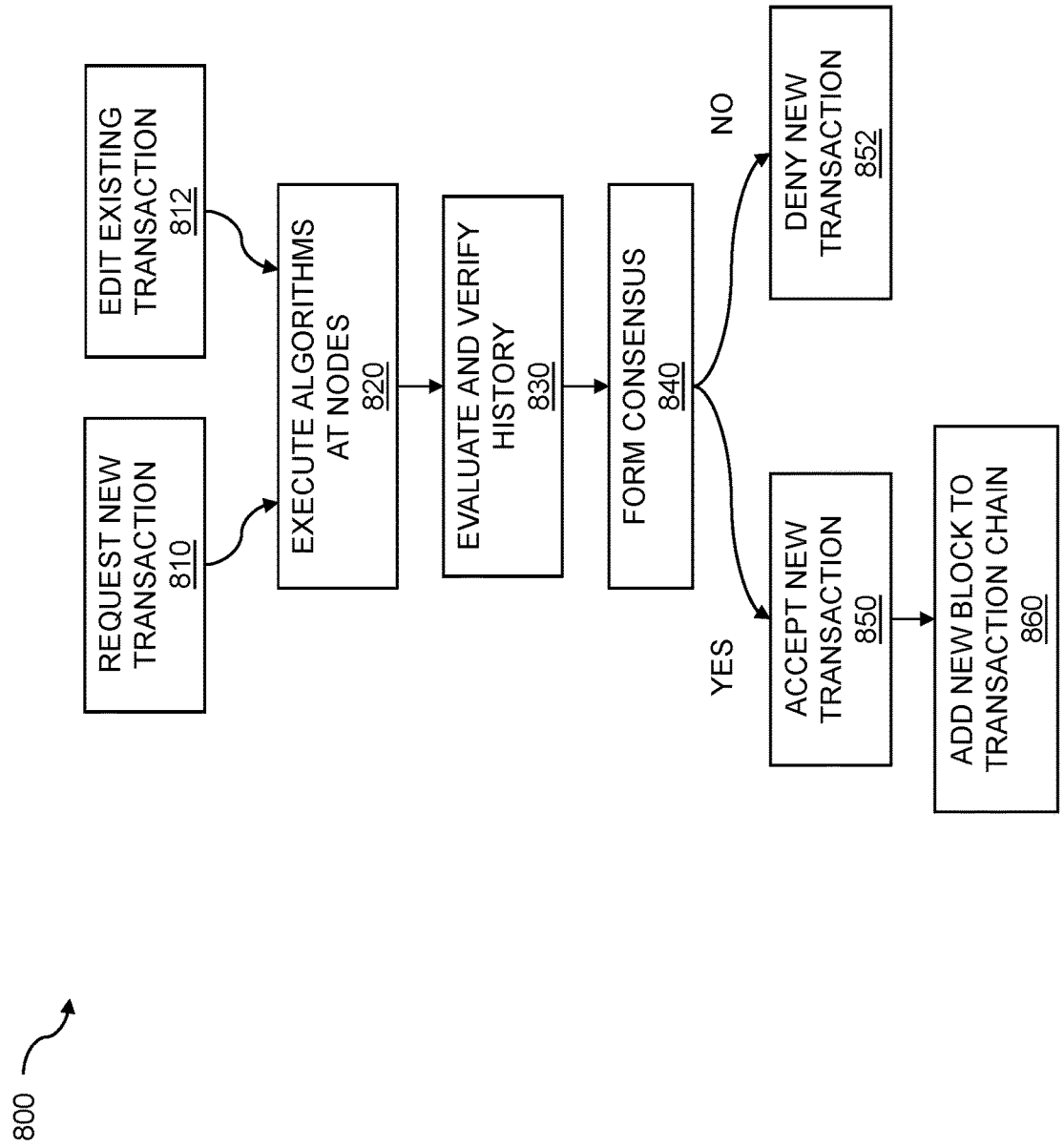
FIG. 8 is a flow diagram for handling transactions.

FIG. 8 is a flow diagram for handling transactions. Transaction handling can be used for hybrid digital ledger control with address encoding. A digital ledger is accessed using a centralized computing platform, where the digital ledger comprises a decentralized blockchain. A wallet address is determined for a user, where the wallet address is associated with a digital token in the digital ledger. The encoding can include hashing the wallet address. The encoding can include signing the wallet address that was hashed, where the signing is performed using a private key from a digital purveyor. The encoding can further comprise using a private key to generate the digitally mapped value. The encoding can further comprise inclusion of a smart contract. Access to the digital token is enabled, wherein the access is enabled using the encoding, the centralized computing platform, and the digital ledger. An entry is appended to the digital ledger, where the entry includes the digitally mapped value. The smart contract can be updated using the centralized computing platform, wherein the updating reflects the access enabled to the digital token.

Online transactions can be secured by using a blockchain. The blockchain can include a decentralized blockchain. A blockchain is a digital ledger that supports the recording of digital transactions such as online transactions. The blockchain records the online transactions as a decentralized digital ledger. The digital ledger is widely distributed, where the wide distribution can include global distribution. The registered transactions are hashed and stored such that the transactions cannot be altered, modified, changed, corrupted, tampered with, etc., after the transactions have been recorded, thus securing the registered transactions. Veracity of a registered transaction is authenticated based on collaboration among systems that support the decentralized digital ledger. The authentication is based on verifying a hashchain for the transaction. The blockchain is based on a hashchain within a hashchain.

The flow 800 includes requesting a new transaction 810. A new transaction can include starting a new blockchain where the new transaction can represent the first or root block of the blockchain. The new transaction can include adding a transaction to an existing blockchain. The new transaction can include adding a new block to the blockchain based on a time, such as adding a block every five minutes, for example. The new transaction can include receiving an updated blockchain from a peer in a distributed digital ledger. The flow 800 includes editing an existing transaction 812. A block in the blockchain can be edited for a variety of purposes such as updating, modifying, correcting, or otherwise changing the contents of a block. A block in the blockchain could be updated to correct a data corruption event. As discussed elsewhere, editing a transaction, data, a block, etc., can require determining a new nonce value for the block that is to be edited.

The flow 800 includes executing algorithms at nodes 820. An algorithm, code segment, app, application, program, etc., can be executed at a node based on a request for a new transaction. The algorithm, code segment, etc., can be used to process data as part of a cipher chain. The flow 800 includes evaluating and verifying a history 830 of a blockchain. Recalling the discussion of a blockchain and its formation, one notes that a block in the blockchain includes a label or number, a nonce, data, a previous hash, and a hash generated for the current block based on the other block information. Since the hash for a block in the blockchain is computed based on the hash from the previous block, the determination of the hash for the current block is iterative. One unauthorized change in a block earlier in a blockchain invalidates not only the block in which the unauthorized change was made but also all subsequent blocks. Evaluation and verification of the history of a block can ensure the veracity of the block, the blockchain, etc.

The flow 800 includes forming a consensus 840. Each node that is included in a distributed digital ledger includes a copy of the blockchain. The nodes can be distributed geographically. Each node, having evaluated and verified the history of its copy of the blockchain, forms a score for a request for a new transaction. The nodes collaborate to form a consensus on whether to allow the transaction. The collaboration among nodes can include collective self-interest. The collaboration among the nodes can support high confidence in data security, integrity, and so on. If the consensus formed from the evaluation and verification by the nodes is "no", then the new transaction is denied 852. If the consensus formed from the evaluation and verification by the nodes is "yes", then the new transaction is accepted 850. The flow 800 includes adding a new block to the transaction chain 860. Adding a new block to the transaction chain includes obtaining the hash from the previous block; obtaining the transaction, data, etc. for the new block; and generating a hash for the current (new) block. The new block can then be added to the blockchain. As described elsewhere, the addition of the new block can be distributed to the peers that are included in the distributed digital ledger. The new block can be added to the blockchains at the peers, the updated blockchain can overwrite the blockchain existing at the peers, etc. Various steps in the flow 800 may be changed in order, repeated, omitted, or the like without departing from the disclosed concepts. Various embodiments of the flow 800 can be included in a computer program product embodied in a non-transitory computer readable medium that includes code executable by one or more processors.

Figure 9:
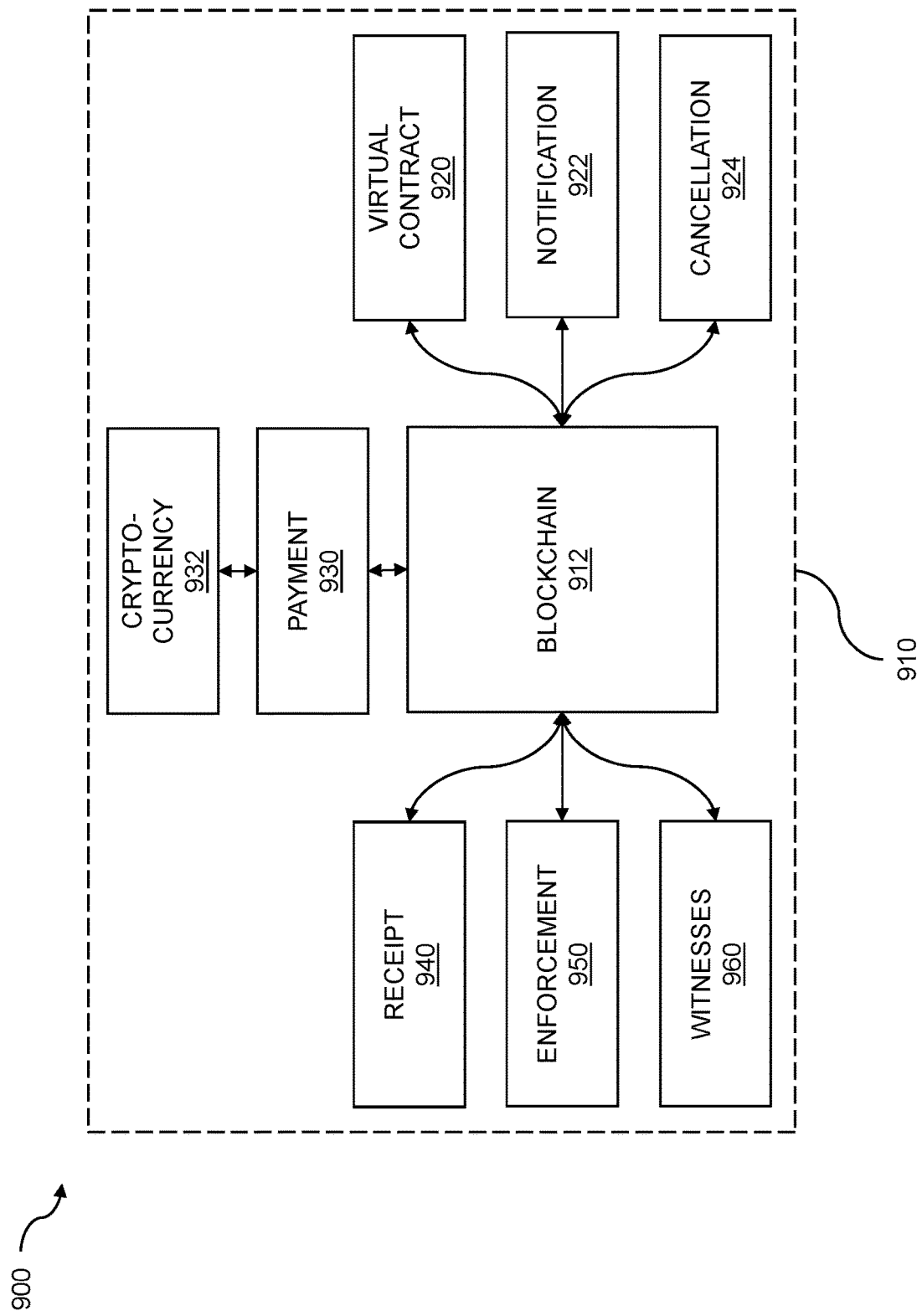
FIG. 9 shows elements of a smart contract.

FIG. 9 shows elements of a smart contract. A smart contract can be used for hybrid digital ledger control with address encoding. A digital ledger such as a decentralized blockchain is accessed using a centralized computing platform. A wallet address is determined for a user. The wallet address is associated with a digital token in the digital ledger. A digitally mapped value is encoded based on the wallet address, where the encoding can further include using a private key to generate the digitally mapped value. The private key can be from a digital purveyor. The digitally mapped value is reverified by re-encoding the wallet address. Access to the digital token is enabled, wherein the access is enabled using the encoding, the centralized computing platform, and the digital ledger. An entry is appended to the digital ledger, where the entry includes the digitally mapped value. A transaction can be rejected due to the re-encoding of the wallet address having an incorrect private key signature.

In FIG. 9, elements of a smart contract are shown 900. A smart contract 910 can be based on a digital ledger. In embodiments, the digital ledger comprises a blockchain 912. A blockchain can include two types of records, where the blockchain records can include blocks and transactions. A given block in the blockchain can include transactions, where the transactions have been determined to be valid. A transaction can be based on enabling a virtual contract 920. The virtual contract 920 can include a digital contract. The virtual contract can include notification 922. A notification 922 can occur when the virtual contract has been changed, the virtual contract has been enabled, the virtual contract has expired, and so on. The virtual contract 920 can include cancellation 924. Cancellation of the virtual contract such as a digital contract can occur due a failure of any parties involved in the virtual contract to meet their obligations as described in the virtual contract. A transaction can include a payment 930. The payment 930 can be based on a digital currency such as a cryptocurrency 932. The cryptocurrency can include Ethereum™. The payment can be collected from a user, remitted to a user, remitted to digital purveyor, and so on. The payment can be made by the user to purchase digital tokens from the digital purveyor.

The smart contract 910 can include a receipt 940. The receipt 940 can be recorded in the blockchain 912. The receipt can be used to show a given transaction in the blockchain 912. The smart contract 910 can include enforcement 950. Enforcement 950 of the smart contract 910 can include collecting funds from a buyer, providing funds to a seller, collecting a good or a service from the seller, providing a good or a service to the buyer, and so on. Enforcement can include penalties when there is a cancellation 924 of the virtual contract. Transactions recorded in the blockchain 912 can be observed by witnesses 960. Witnesses can see transactions, vote on the validity of transactions, arbitrate disputes relating to transactions, and so on. The witness may not be able to determine the identities of any parties involved in the smart contract.

Figure 10:
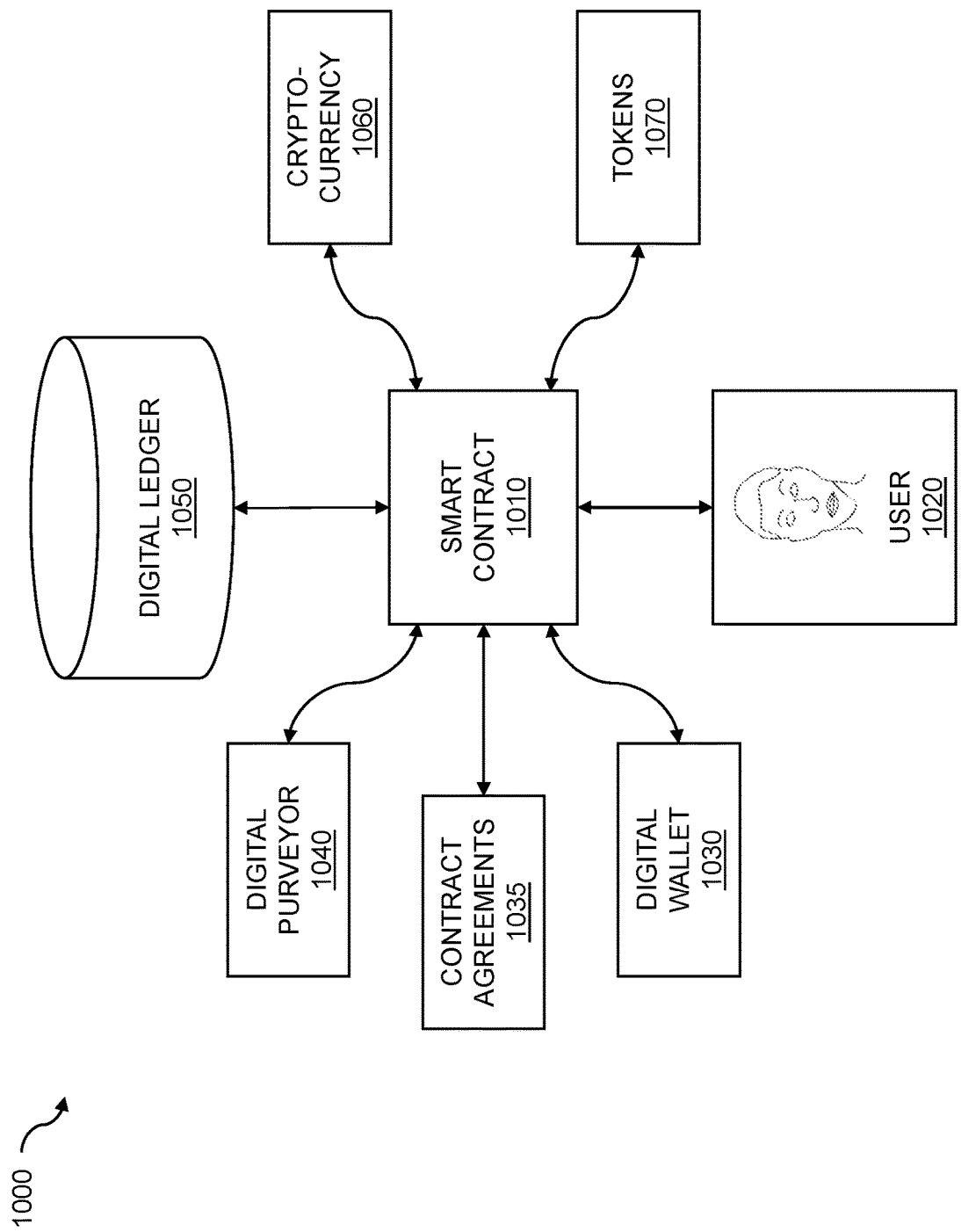
FIG. 10 illustrates a block diagram of smart contract usage.

FIG. 10 illustrates a block diagram of smart contract usage 1000. A smart contract can be used for hybrid digital ledger control with address encoding. A digital ledger is accessed using a centralized computing platform, where the digital ledger can include a decentralized blockchain. A wallet address is determined for a user, where the wallet address is associated with a digital token in the digital ledger. A digitally mapped value is encoded based on the wallet address. The encoding can include hashing the wallet address. The encoding can include signing the wallet address that was hashed, where the signing is performed using a private key from a digital purveyor. The encoding can further comprise using a private key to generate the digitally mapped value. The encoding can further comprise inclusion of a smart contract. Access to the digital token is enabled, where the access is enabled using the encoding, the centralized computing platform, and the digital ledger. The digital token can provide a database credit.

As discussed previously, the encoding of a digitally mapped value can further comprise inclusion of a smart contract 1010. The smart contract can be used to exchange one or more digital currencies such as cryptocurrencies and digital tokens. The smart contract 1010 can be enabled by agreeing to one or more written stipulations. The stipulations can include checking a box, clicking a radio button, entering text into a web form, and so on. The user 1020 can be required to accept, or agree to, the one or more stipulations. Upon accepting the one or more stipulations of the smart contract, the smart contract can be enabled. A user 1020 can interact with a smart contract 1010. The smart contract 1010 can access a digital wallet 1030. The digital wallet 1030 can belong to the user 1020. The digital wallet 1030 can include a wallet address. The wallet addresses can be hashed. The digital wallet can include one or more cryptocurrencies owned by the user 1020. The cryptocurrency can include Ethereum™. The smart contract 1010 can be enabled by contract agreements 1035. The contract agreements 1035 can be stipulations and terms that the user 1020 explicitly accepts in order to enable the smart contract 1010.

The smart contract 1010 can be established by a digital purveyor 1040 for use in a digital transaction. The digital transaction can be one that is in the process of being executed, such as a real time or near real time transaction, or it can be one that is executed in the future, such as a crowd-sell event that may take place one week in the future. The smart contract 1010 can be enabled by a digital signature obtained using a private key from a digital purveyor 1040. The digital signature can verify a hashed wallet address for digital wallet 1030 or user 1020. Embodiments include signing the wallet address that was hashed, where the signing can be performed using the private key from the digital purveyor. The signing can include a digital signature. The smart contract 1010 can be authenticated using a digital ledger 1050. The digital ledger 1050 can be used for recording various transactions, including transactions related to digital currencies such as cryptocurrencies. The smart contract 1010 can include accepting one or more cryptocurrencies 1060. The cryptocurrencies 1060 can be transferred into the digital wallet 1030, out of the digital wallet, to the digital purveyor, and so on. The smart contract 1010 can include providing tokens 1070. Tokens 1070 can be purchased by the user 1020, where the tokens can be provided by the digital purveyor 1040. The smart contract 1010 can allow preapproval for the user 1020 to purchase tokens 1070 from the digital purveyor 1040 using cryptocurrency 1060 from the digital wallet 1030 when enabled by contract agreements 1035 and recorded in a digital ledger 1050. The digital tokens can be used for a variety of purposes including participating in eSports.

Figure 11:
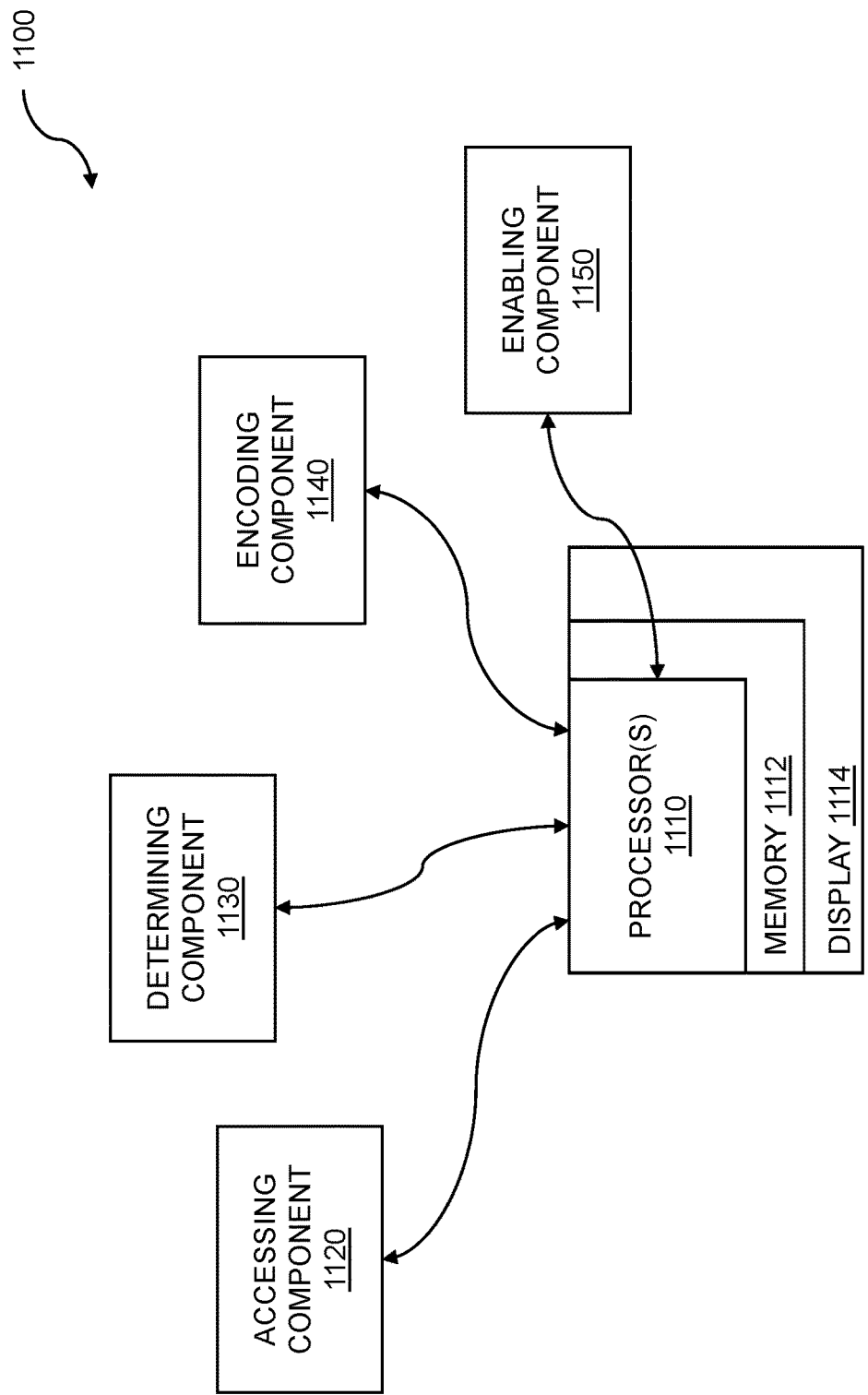
FIG. 11 is a system diagram for authentication.

FIG. 11 is a system diagram for authentication. The authentication can enable hybrid digital ledger control with address encoding. A system 1100 can include one or more processors 1110 coupled to a memory 1112, which stores instructions. The memory can store information relating to a digital ledger, a wallet address, encoded values, and so on. The system 1100 can include one or more processors that can be coupled to a display 1114. The display can show data, addresses, keys, smart contracts, and so on. In embodiments, one or more processors 1110 are coupled to the memory 1112 where the one or more processors, when executing the instructions which are stored, are configured to: access a digital ledger using a centralized computing platform, wherein the digital ledger comprises a decentralized blockchain; determine a wallet address for a user, wherein the wallet address is associated with a digital token in the digital ledger; encode a digitally mapped value based on the wallet address; and enable access to the digital token, wherein the access is enabled using the encoding, the centralized computing platform, and the digital ledger.

The system 1100 can include one or more other components such as an accessing component 1120, a determining component 1130, an encoding component 1140, and an enabling component 1150. The system 1100 can comprise hybrid digital ledger control with address encoding. The accessing component 1120 can include codes, instructions, or functions for accessing a digital ledger using a centralized computing platform. The digital ledger can include a decentralized blockchain. The decentralized blockchain can include an expanding list of blocks, where the blocks are cryptographically secured and linked. The distributed blockchain can change over time by appending an entry to the digital ledger. Various entries can be appended to the digital ledger. In embodiments, the entry that is appended to the digital ledger can include a digitally mapped value. The determining component 1130 can comprise codes, instructions, or functions for determining a wallet address for a user, where the wallet address is associated with a digital token in the digital ledger. The digital token can be provided by various digital sources. In embodiments, the digital token can be provided via the centralized computing platform from a digital purveyor. The token can be purchased with a credit card or bank transfer, by exchanging a cryptocurrency, and the like. The digital token can provide a database credit. In embodiments, the digital token can enable access to a digital competition platform. Access to the competition platform can be further controlled based on a smart contract and the database credit. In embodiments, the database credit can be enabled using the smart contract. The smart-contract can be enabled by terms and conditions for purchasing tokens with which to pay for participation in an online eSport.

The encoding component 1140 can comprise codes, instructions, or functions for encoding a digitally mapped value based on the wallet address. The encoding can further include using a private key to generate the digitally mapped value. The private key can be issued by the digital purveyor, a key clearing house, etc. The encoding can include hashing the wallet address. A function used for the hashing the wallet address can be based on a cyclic redundancy check, a checksum, a universal hash function, a cryptographic or non-cryptographic function, and so on. The encoding can include signing the wallet address that was hashed, where the signing is performed using a private key from a digital purveyor. The encoding can include using a private key to generate the digitally mapped value. The encoding can further comprise inclusion of a smart contract. The encoding can include obtaining an agreement by the user to enable the smart contract. The encoding can include re-encoding, where the re-encoding can include matching a private key signature.

The enabling component 1150 can comprise codes, instructions, or functions for enabling access to the digital token, wherein the access is enabled using the encoding, the centralized computing platform, and the digital ledger. The digitally mapped value can include the wallet address, a transaction amount, and a type of digital currency. In embodiments, the digital currency can include cryptocurrency, where the cryptocurrency can be Ether™. The transaction can be based on reverifying the digitally mapped value by re-encoding the wallet address. The re-encoding can be based on matching. In embodiments, the re-encoding can include matching a private key signature. The matching a private key signature can be accomplished by the digital purveyor. The transaction can be rejected based on a mismatch with a key, a secret key, a digital watermark, a signature, etc. In embodiments, the transaction can be rejected due to the re-encoding of the wallet address having an incorrect private key signature.

Thus, disclosed is a computer system for authentication comprising: a memory which stores instructions; one or more processors coupled to the memory wherein the one or more processors, when executing the instructions which are stored, are configured to: access a digital ledger using a centralized computing platform, wherein the digital ledger comprises a decentralized blockchain; determine a wallet address for a user, wherein the wallet address is associated with a digital token in the digital ledger; encode a digitally mapped value based on the wallet address; and enable access to the digital token, wherein the access is enabled using the encoding, the centralized computing platform, and the digital ledger.

Further disclosed embodiments can include a computer program product embodied in a non-transitory computer readable medium for authentication, the computer program product comprising code which causes one or more processors to perform operations of: accessing a digital ledger using a centralized computing platform, wherein the digital ledger comprises a decentralized blockchain; determining a wallet address for a user, wherein the wallet address is associated with a digital token in the digital ledger; encoding a digitally mapped value based on the wallet address; and enabling access to the digital token, wherein the access is enabled using the encoding, the centralized computing platform, and the digital ledger.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for authentication comprising:
    accessing a digital ledger using a centralized computing platform, wherein the digital ledger comprises a decentralized blockchain;
    determining a wallet address for a user, wherein the wallet address is associated with a digital token in the digital ledger;
    encoding a digitally mapped value based on the wallet address;
    enabling access to the digital token, wherein the access is enabled using the encoding, the centralized computing platform, and the digital ledger;
    signing, by the centralized computing platform, a message to unlock functions in a smart contract; and
    reverifying the digitally mapped value by re-encoding the wallet address, wherein the re-encoding comprises checking for a mismatch of a private key signature.

2. The method of claim 1 further comprising appending an entry to the digital ledger.

3. The method of claim 2 wherein the entry includes the digitally mapped value.

4. The method of claim 1 further comprising updating a smart contract using the centralized computing platform, wherein the updating reflects the access enabled to the digital token.

5. The method of claim 1 wherein the digitally mapped value includes the wallet address, a transaction amount, and a type of digital currency.

6. The method of claim 5 wherein the digitally mapped value is hashed.

7. The method of claim 6 further comprising signing the digitally mapped value that is hashed.

8. The method of claim 1 wherein the digital token is provided via the centralized computing platform from a digital purveyor.

9. The method of claim 8 wherein the centralized computing platform is managed by the digital purveyor.

10. The method of claim 9 wherein the digital token provides access to a digital competition platform.

11. The method of claim 9 wherein the digital token provides a database credit.

12. The method of claim 11 wherein the database credit is enabled using a smart contract.

13. The method of claim 9 further comprising, mapping, by the digital purveyor, the digital token to a fiat value.

14. The method of claim 13 further comprising providing the fiat value to the user.

15. The method of claim 8 wherein the centralized computing platform ensures that a sum of the platform balances is equal to the digital ledger.

16. The method of claim 8 wherein the centralized computing platform provides a balance associated with the wallet address of the user.

17. The method of claim 1 wherein the digital token is accessed via the centralized computing platform using a cryptocurrency.

18. The method of claim 17 wherein the centralized computing platform is managed by a digital purveyor.

19. The method of claim 18 wherein the centralized computing platform confirms a cryptocurrency address.

20. The method of claim 1 wherein the encoding comprises hashing the wallet address.

21. The method of claim 20 wherein the encoding further comprises signing the wallet address that was hashed, wherein the signing is performed using a private key from a digital purveyor.

22. The method of claim 1 wherein the encoding further comprises inclusion of a smart contract.

23. A computer program product embodied in a non-transitory computer readable medium for authentication, the computer program product comprising code which causes one or more processors to perform operations of:
    accessing a digital ledger using a centralized computing platform, wherein the digital ledger comprises a decentralized blockchain;
    determining a wallet address for a user, wherein the wallet address is associated with a digital token in the digital ledger;
    encoding a digitally mapped value based on the wallet address;
    enabling access to the digital token, wherein the access is enabled using the encoding, the centralized computing platform, and the digital ledger;
    signing, by the centralized computing platform, a message to unlock functions in a smart contract; and
    reverifying the digitally mapped value by re-encoding the wallet address, wherein the re-encoding comprises checking for a mismatch of a private key signature.

24. A computer system for authentication comprising:
    a memory which stores instructions;
    one or more processors coupled to the memory wherein the one or more processors, when executing the instructions which are stored, are configured to:
    access a digital ledger using a centralized computing platform, wherein the digital ledger comprises a decentralized blockchain;
    determine a wallet address for a user, wherein the wallet address is associated with a digital token in the digital ledger;
    encode a digitally mapped value based on the wallet address;
    enable access to the digital token, wherein the access is enabled using the encoding, the centralized computing platform, and the digital ledger;
    sign, by the centralized computing platform, a message to unlock functions in a smart contract; and reverify the digitally mapped value by re-encoding the wallet address, wherein the re-encoding comprises checking for a mismatch of a private key signature.

25. The method of claim 1 further comprising, in response to determining a mismatch of the private key signature, repeating the re-encoding.

26. The method of claim 1 further comprising, in response to determining a mismatch of the private key signature, indicating a transaction associated with the smart contract as potentially fraudulent.

* * * * *